US012562488B1

(12) United States Patent
Moschetti et al.

(10) Patent No.: US 12,562,488 B1
(45) Date of Patent: Feb. 24, 2026

(54) MAGNETO-ELECTRIC DIPOLE ANTENNA FORMED IN LAYERED STACKUP

(71) Applicant: Lockheed Martin Corporation, Bethesda, MD (US)

(72) Inventors: Peter Moschetti, Lakewood, CO (US); Thomas Henry Hand, Highlands Ranch, CO (US); Roger Douglas Hasse, Superior, CO (US); Peter Aaen, Evergreen, CO (US); Mahyar Vahabzadeh, Phoenix, AZ (US); Erik Lier, Phoenixville, PA (US); Elie Germain Tianang, Aurora, CO (US)

(73) Assignees: LOCKHEED MARTIN CORPORATION, Bethesda, MD (US); ROGERS CORPORATION, Chandler, AZ (US); COLORADO SCHOOL OF MINES, Golden, CO (US)

( * ) Notice: Subject to any disclaimer, the term of this patent is extended or adjusted under 35 U.S.C. 154(b) by 103 days.

(21) Appl. No.: 18/392,341

(22) Filed: Dec. 21, 2023

(51) Int. Cl.
*H01Q 9/28* (2006.01)
*H01Q 21/00* (2006.01)

(52) U.S. Cl.
CPC ......... *H01Q 9/285* (2013.01); *H01Q 21/0093* (2013.01)

(58) Field of Classification Search
CPC ........................... H01Q 9/285; H01Q 21/0093
See application file for complete search history.

(56) References Cited

U.S. PATENT DOCUMENTS

| | | | | |
|---|---|---|---|---|
| 11,909,120 | B1 | 2/2024 | Tianang et al. | |
| 2023/0070175 | A1* | 3/2023 | Moallem | H01Q 9/0407 |
| 2023/0076013 | A1* | 3/2023 | Moallem | H01Q 21/24 |
| 2023/0261381 | A1* | 8/2023 | Hassan | H01Q 21/24 343/893 |

OTHER PUBLICATIONS

Ding, Chen et al., "A Low-Profile Dual-Polarized Magneto-Electric Dipole Antenna," IEEE Access, vol. 7, pp. 181924-181932, Dec. 26, 2019.
Li, Mingjian et al., "A Low-Profile Magneto-Electric Dipole Antenna," iWEM 2012 Proceedings, 3 pages, 2012.
Scalise, Giuseppe et al., "Magneto-Electric Dipole Antenna For 5-G Applications," 14th European Conference on Antennas and Propagation, 3 pages, Mar. 2020.

* cited by examiner

*Primary Examiner* — Seung H Lee

(57) ABSTRACT

Provided herein are various enhancements for planar antennas and corresponding antenna arrays. In one example, an assembly includes a plurality of antenna cells formed in a shared printed circuit board stackup, a rigid superstrate layer mounted onto the printed circuit board stackup, and a substrate layer mounting the printed circuit board stackup to a baseplate. Each of the antenna cells comprise conductive plates at quadrants of the antenna cell and coupled through vias in the layered stackup arrangement from a plate layer to a ground plane layer, flared antenna feeds arranged in an orthogonal pair positioned within central gaps between the conductive plates and below the plate layer, and barrier vias positioned in sets below the conductive plates in each of the quadrants and arrayed about the flared antenna feeds.

20 Claims, 10 Drawing Sheets

MAGNETO-ELECTRIC DIPOLE ANTENNA FORMED IN LAYERED STACKUP

TECHNICAL BACKGROUND

Various radio frequency (RF) antenna arrangements have been developed for microwave frequency applications, such as use on space-deployed craft for communications and sensing. Some example antenna arrangements include dipole, slot, helix, horn, Yagi, microstrip, and patch antennas, each with various limitations on packaging, bandwidth, cross-polarization, and radiation pattern directivity. Microwave RF transmission systems can also employ arrays of dozens or hundreds of antenna elements, useful for applications such as electronically-steerable arrays (ESAs), which have packaging or sizing requirements that exclude certain antenna styles or types.

Magnetoelectric (ME) dipole antennas have been developed which include antenna arrangements having T-shaped or U-shaped orthogonal feed elements surrounded by four conductive plates that are positioned above a ground plane. The feed elements along with adjacent surfaces of the conductive plates in the ME dipole antenna can establish both electric and magnetic modes of operation, and can provide dual polarization. ME dipole antennas can be employed over frequency ranges from UHF to Ka-Band. However, existing ME dipole antennas suffer from several limitations, including multipaction and structural fragility which make them unsuitable for most space-deployed applications. Also, implementations of ME dipole antennas and associated arrays are difficult to manufacture due to the use of individually produced antenna elements having metal-air configurations.

Some newer antenna configurations include planar ultra-wideband modular antenna (PUMA) arrays, which are low-profile, planar-printed, dual-polarized RF apertures with direct unbalanced 50-ohm coaxial feeds and a modular tile assembly. In each PUMA array, individual antenna 'cells' are arrayed in a grid or other arrangement. The antenna cells are formed in a layered stackup, such as produced by a printed circuit process, and each antenna cell includes planar dipole arms positioned above a capacitive plate element. PUMA arrays can also implement capacitive 'fins' on vertical vias feeding the dipole arms. These capacitive fins can establish inter-dipole capacitance for better low-frequency performance, common-mode interference mitigation, and to increase the operating bandwidth. However, these PUMA arrays were not designed for space or vacuum applications, and also suffer from many operational limitations including high sensitivity to cell cross-coupling errors.

SUMMARY

Magneto-Electric (ME) Arrays, also referred to as MEDAs, can be formed from discrete metallic antenna elements, or from layered arrangements similar to printed circuit board (PCB) configurations. Provided herein are various enhancements for layered/planar magneto-electric (ME) antennas and associated array structures. The examples herein can achieve a low-profile, dual-polarized, planar, wideband electronically steered array (ESA), with capability of steering beams up to 60 degrees off normal, while maintaining low part count and good axial ratio for a dual circularly polarized (CP) antenna. An antenna array can be formed into a stacked layer arrangement within individual antenna cells having various features to provide for enhanced operation in the X-band to Ka-Band of RF frequencies, among others.

While the enhancements discussed herein can be deployed concurrently in an antenna array, variations can have some enhancements deployed individually or combinations thereof. These enhancements include co-located feed elements, which can have flared configurations and via structures arrayed about the feeds. Other enhancements include an additively manufactured monolithic superstrate layer which provides increased bandwidth and structural rigidity as compared to other superstrates, such as dielectric foam. Various via structures and conductive frame structures can be included about the perimeter or vertices of each antenna cell to provide enhanced mode suppression at boresight and at scan. Hogouts or underside-milled features can be included in each cell to increase bandwidth and lower the effective dielectric constant for each cell. Also, the cell geometries can vary from square/rectangular to hexagonal and other configurations and cell lattice arrangements.

In one example implementation, an assembly includes a plurality of antenna cells formed in a shared printed circuit board stackup, a rigid superstrate layer mounted onto the printed circuit board stackup, and a substrate layer mounting the printed circuit board stackup to a baseplate. Each of the antenna cells comprise conductive plates at quadrants of the antenna cell and coupled through vias in the layered stackup arrangement from a plate layer to a ground plane layer, flared antenna feeds arranged in an orthogonal pair positioned within central gaps between the conductive plates and below the plate layer, and barrier vias positioned in sets below the conductive plates in each of the quadrants and arrayed about the flared antenna feeds.

In another example implementation, an apparatus includes a substrate layer mounting a magneto-electric antenna cell to a baseplate, and a rigid superstrate layer mounted onto the magneto-electric antenna cell and having a dielectric constant under a threshold value for a frequency range selected for the magneto-electric antenna cell. The apparatus also includes the magneto-electric antenna cell formed by a layered stackup arrangement and comprising conductive plates at quadrants of the magneto-electric antenna cell and coupled through vias in the layered stackup arrangement from a plate layer to a ground plane layer, flared antenna feeds arranged in an orthogonal pair positioned within central gaps between the conductive plates and below the plate layer, and barrier vias positioned in sets below the conductive plates in each of the quadrants and arrayed about the flared antenna feeds.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
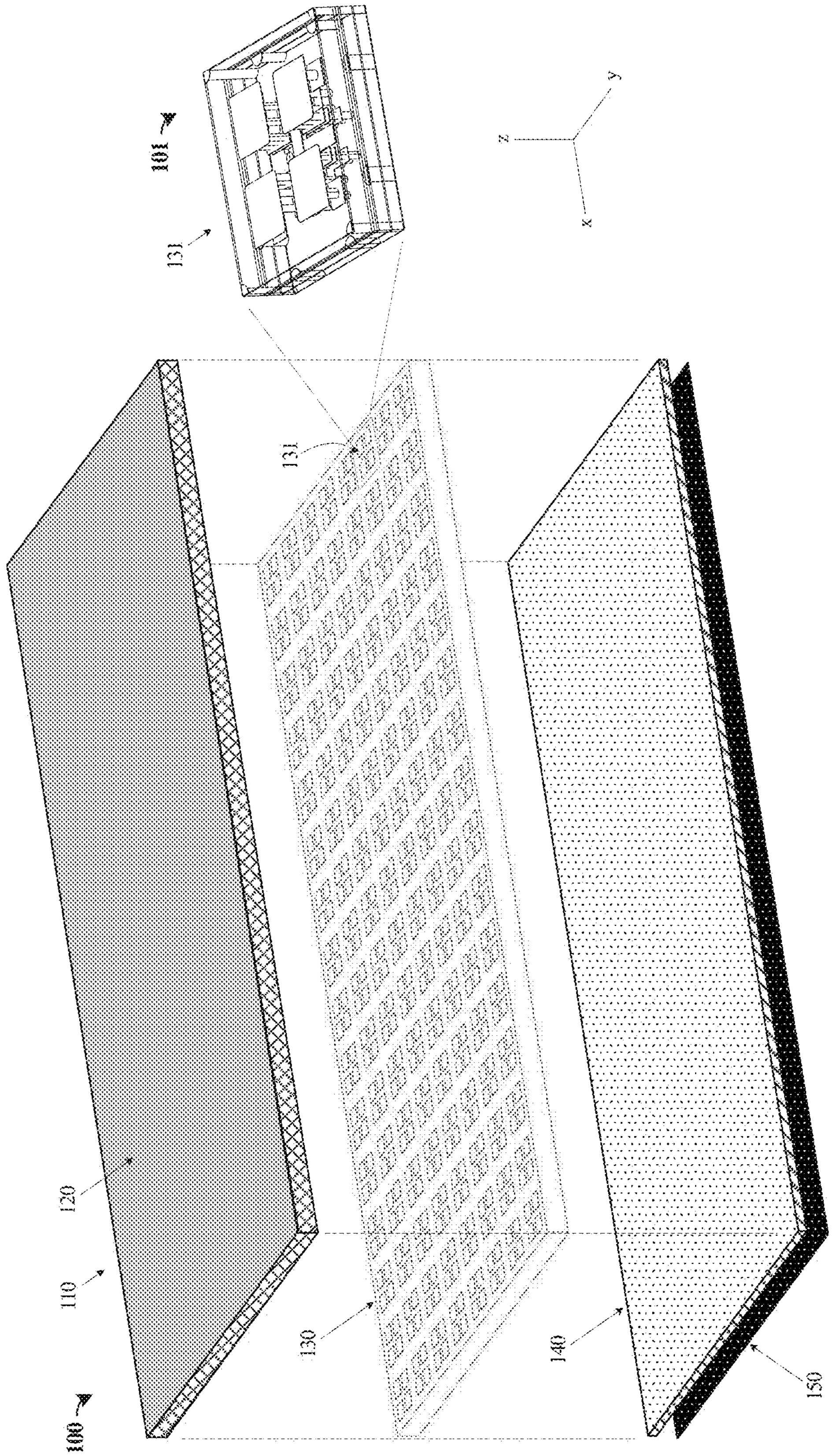
FIG. 1 illustrates an antenna array in an implementation.

The examples herein achieve enhancements to planar magneto electric (ME) Dipole antennas which can support dual polarization (right-hand circular polarization (RHCP) and left-hand circular polarization (LHCP) with an additively manufactured superstrate. Such antennas can be employed in large arrays used to form electronically steered arrays (ESAs), or other arrangements and deployed onto vehicles, structures, satellites, and other applications. Various frequency ranges can be supported, such as X-band to Ka-band, among others. The examples herein can provide electronic beam steering at up to 60 degrees off boresight, while maintaining low part count, which provides versatility to enable a wide range of satellite and orbital configurations, from Low Earth Orbit (LEO) to Geosynchronous Earth Orbit (GEO). Although the examples herein include planar antenna cells and corresponding arrays, it should be understood that other antenna types can benefit from these enhanced techniques, structures, features, or assemblies.

Various structural features are included to enhance RF performance of antenna arrays. These include forming an array of ME antenna cells in a layered stackup arrangement, such as a printed circuit board stackup shared among all antenna cells of an array. These antenna cells can comprise generally square or generally hexagonal arrangements which are 'tiled' into large arrays. Co-located phase centers can be achieved for each antenna cell with co-located feed elements which can achieve dual RHCP/LHCP over wide scan. This approach is attractive to many applications, including space-deployed applications, due to the corresponding co-located phase center giving each antenna cell good axial ratio (<3 dB) over scan for both RHCP and LHCP signals (e.g., in dual CP operation). This also allows for the reduction of backend beamforming electronics by at least 50%, which has a significant impact on power and cost of arrays. These feed elements can also have a flared configuration which provides additional bandwidth at boresight and at scan. Via structures coupled to ground can be arrayed about the flared feed structures (and mirrored within the antenna cell). Various other via structures can be included to further suppress in-band resonances at boresight and scan, suppress unwanted propagation/transmission modes, and suppress modes at the low end of the frequency range for scan operations. These via structures include corner or vertex vias in each antenna cell which provide suppression of modes at the low end of the frequency range for scan operations. Via fence structures along the boundary of the antenna cells can provide reduction of in-band resonances at boresight and at scan. Picture frames or conductive border frames can be established with vias and metallized features formed about the perimeter of each antenna cell to suppress various unwanted modes at boresight and at scan, but can limit port performance over scan (e.g., efficiency). Material within the layered stackup can be bored or hogged out below dipole elements in the printed circuit board layers/materials. These milled or drilled voids can increase bandwidth of each antenna cell at boresight and lower the overall effective dielectric constant (K or Dk) for the antenna cells to provide for impedance matching and overall efficiency increases.

Potential applications areas that can benefit from these antenna technologies include but are not limited to military, space, commercial space, remote sensing applications, radar antennas for ground, airborne, and space platforms (both government and commercial), Synthetic Aperture Radar (SAR), Electronic Warfare (EW), and Electronic Attack (EA). Such antenna arrays can be widely used for various applications across commercial and government industries, such as in auto-tracking communication or direction-finding antennas. As space-based constellations proliferate and spacecraft/satellite missions become more complex, future applications will require more RF beams and bandwidth capability to satisfy data needs. Next-generation space-based missions that leverage electronically scanned array (ESA) technology can employ antennas having front-end apertures that are low-loss, high cross-polarization isolation, low-profile, and low mass. These features discussed herein enable the minimization of size, weight, and power (SWaP), which in turn minimizes overall payload and mission cost by permitting payloads to be implemented on a wider range of launch vehicles.

Turning now to a first example implementation of an antenna array, FIG. 1 is presented. FIG. 1 illustrates isometric exploded view 100 of the structure of antenna assembly 110. View 101 illustrates a detailed view of an individual antenna cell 131 formed from a layered stackup arrangement of antenna assembly 110. Further details of antenna cell 131 are found in FIG. 2.

Antenna assembly 110 includes superstrate element 120, antenna array 130, substrate 140, and baseplate 150. Various adhesives, such as epoxy adhesives, or other fastening or mating techniques can be applied to mate surfaces of each layer to each other. Thus, the various layers of antenna assembly 110 are stacked/mated together without significant gaps to form an assembly. In operation, RF links are then coupled to or through baseplate 150 which provides connectors or connections to antenna feed elements of antenna array 130. These RF links can carry RF energy related to radiative transmissions to/from antenna assembly 110. Further RF elements, such as amplifiers, filters, splitters, beamforming equipment, controllers, monitoring elements, and the like, can be coupled to the RF links to establish RF transmissions or to receive RF energy.

Figure 3:
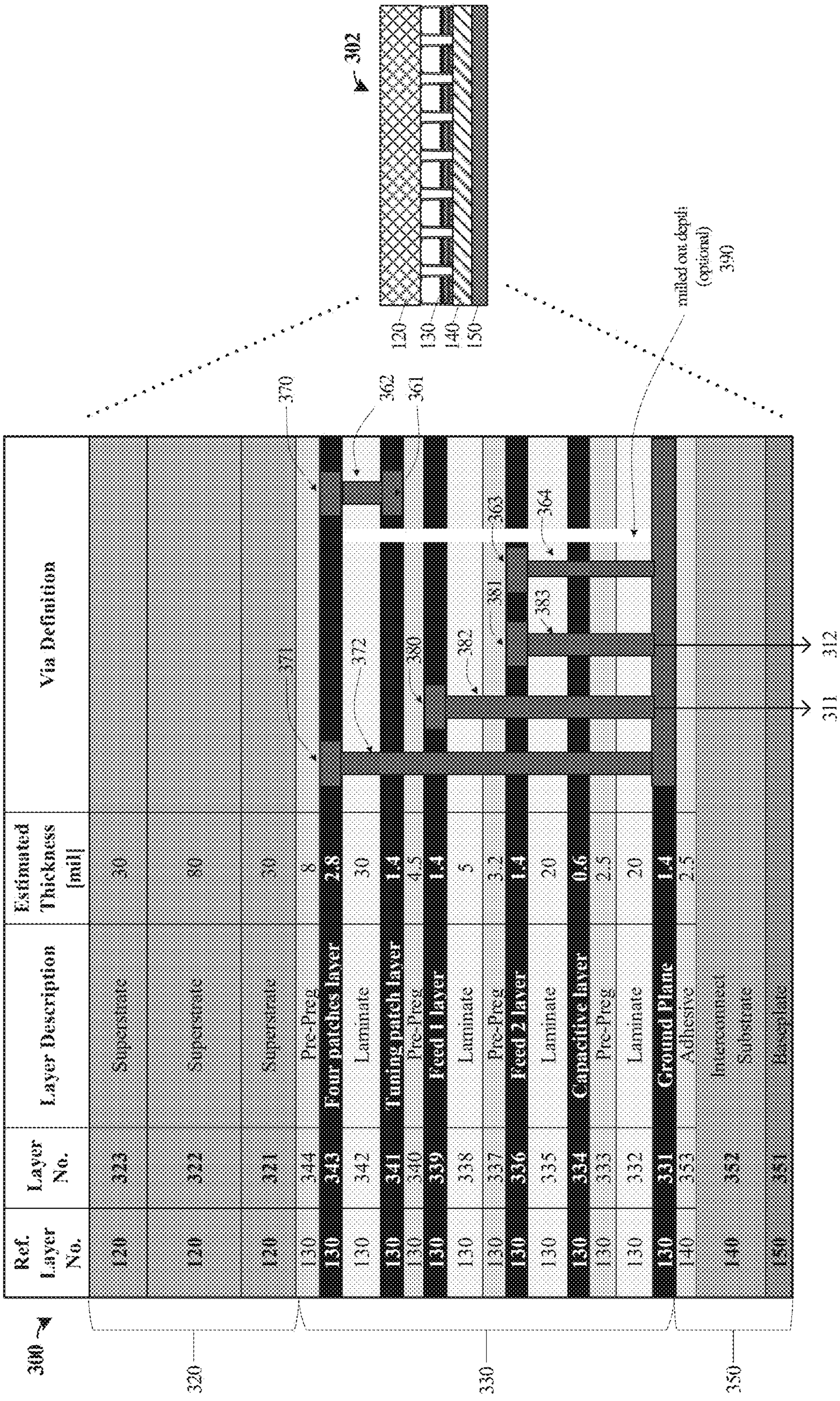
FIG. 3 illustrates a layered stackup of an antenna cell in an implementation.

FIG. 1 includes antenna assembly 110 comprising several layers arranged in a vertical stackup, with 'vertical' corresponding to the noted 'z' axis. These layers, or planes, in the x-y plane can be formed using various manufacturing techniques, such as those employed for printed circuit boards or other laminated stackup manufacturing techniques. For antenna array 130, conductive or metallic features can be etched from conductive planes which are interspersed with dielectric or insulating layers. FIG. 3 discusses an example set of layers in a stackup of antenna array 130, although variations are possible. Antenna cell 131 of view 101 can be replicated or repeated over a selected pattern to form an arrayed lattice or grid of antenna cells, which can be used in various applications including ESAs for transmit and/or receive of RF energy over a wide range of electronic scan angles.

Turning first to superstrate element 120, this portion of antenna assembly 110 comprises an additively manufactured layer or layers which provide selectable dielectric constant interfacing for an antenna array, wide-angle impedance-matching (WAIM) features, and vacuum/environmental protection. Superstrate element 120 avoids the use of foam materials, which have a risk of debonding when foam superstrate materials are adhesively bonded to dielectric laminates. Superstrate element 120 can have selectable dielectric constants (permittivity $\varepsilon_r$, $\kappa$ (e.g., $\varepsilon/\varepsilon_0$), or Dk) which can be manufactured to achieve a desired bandwidth at boresight and scan. Additionally, superstrate element 120 reduces cost and complexity to manufactured large antenna arrays, due in part to reducing the quantity of lamination cycles, removes use of more risky foam materials, and allows for metallization in places not previously feasible. Example materials of the additively manufactured material include Radix™ and other UV-curable 3D printing resins which have rigid mechanical properties after formation. Adhesives or other materials can be used to apply the superstrate layer to an underlying antenna array structure, such as epoxies, and in some examples the material can be directly printed onto the underlying antenna array. Various layers can be included in superstrate element 120, and these layers can be employed to affect or alter the Dk or other RF propagation properties, and can include various internal webbing or lattice structures between external surface skin layers. Superstrate element 120 can also provide a charge bleed off layer for space-based applications where charges can be generated from free oxygen radicals and incident radiation.

Additional layers of a printed circuit board (PCB) stackup formed as a part of antenna array 130 can be used instead of the additively manufactured monolithic material forming superstrate element 120. However, PCB insulating layers typically have a much higher dielectric constant and are more complex and costly. Dielectric foams can reach Dk levels of 1, but are fragile and not suited to many applications. Thus, Radix™ or similar materials can be applied to antenna array 130 in a single piece and reach Dk levels of 2.8 or lower, while being much more structurally resilient and rigid than foams. Moreover, more than one layer of Radix™ or similar materials can be stacked to provide a selected Dk for superstrate element 120, such as a lattice layer formed between two skin/face layers. Additional hog-outs or machined voids (discussed herein) in antenna array 130 can further reduce the Dk for antenna array 130.

Antenna array 130 comprises a lattice or repeated arrangement of individual antenna cells, with example antenna cell 131 shown in view 101. These antenna cells comprise ME style of antennas in this example, although other types and variations are possible. Each antenna cell includes four plate portions which are visible in view 100, for a total of 128 antenna cells integrated into a planar stackup. Antenna cells are formed from a layered stackup of conductive routing layers, conductive planes, and insulating layers which are laminated together to form a circuit board. These printed circuit features can comprise any suitable conductive material including copper, aluminum, various metals or metallic alloys, or conductive carbon allotropes if associated conductive properties are sufficient. The circuit board non-conductive material can comprise a dielectric material such as FR4, RT Duroid, Rogers RO, PTFE, polyimide, and the like. Various solder masking or etch masking can be employed to form the elements by etching a conductive layer away from the underlying substrate. Other manufacturing techniques can be employed to form or modify antenna cells, such as machining, laser ablation, and other suitable techniques.

From here, substrate 140 includes various structures which route/couple RF connections provided on baseplate 150 to corresponding RF antenna cell structures and feed elements of antenna array 130. Example materials and configurations include printed circuit boards formed using materials mentioned above, or other stacked/laminated materials. Other examples include micro-machined, layered, or printed planar RF connections, such as that provided by processes including PolyStrata®, a form of surface micromachining, which can achieve monolithic integration around a nearly air-loaded rectangular coaxial line with interconnection of several (e.g., three to four) vertical layers on a wafer scale.

Baseplate 150 forms a conductive and grounded substrate from which other layers can be stacked, and to which external connectors can be mounted. RF connectors for RF feed links can comprise various types of coaxial connectors, such as miniaturized high frequency coaxial modules in push-on or snap-on mating styles. Examples include Fuzz Buttons®, GPPOR connectors, or SMPM (Sub-Miniature Push-on Micro) miniaturized high frequency coaxial connectors. Center conductors of the RF feed links penetrate through baseplate 150 and are routed through substate 140 to reach antenna array 130. Outer conductors of the RF feed links can couple to one or more of the ground planes in the stackup, or to baseplate 150 (which may also be grounded to a similar RF reference potential). Example materials for baseplate 150 include any suitable conductive or metallic material, such as sheets of aluminum, copper, along with various metallic materials and alloys. A thickness of baseplate 150 can be selected based on a desired mechanical rigidity, conductive/radiative emissions criteria, current carrying capability, and RF frequency, among other considerations. Baseplate 150 can also include various mounting features for mounting antenna assembly 110 into a larger assembly or vehicle.

Figure 2:
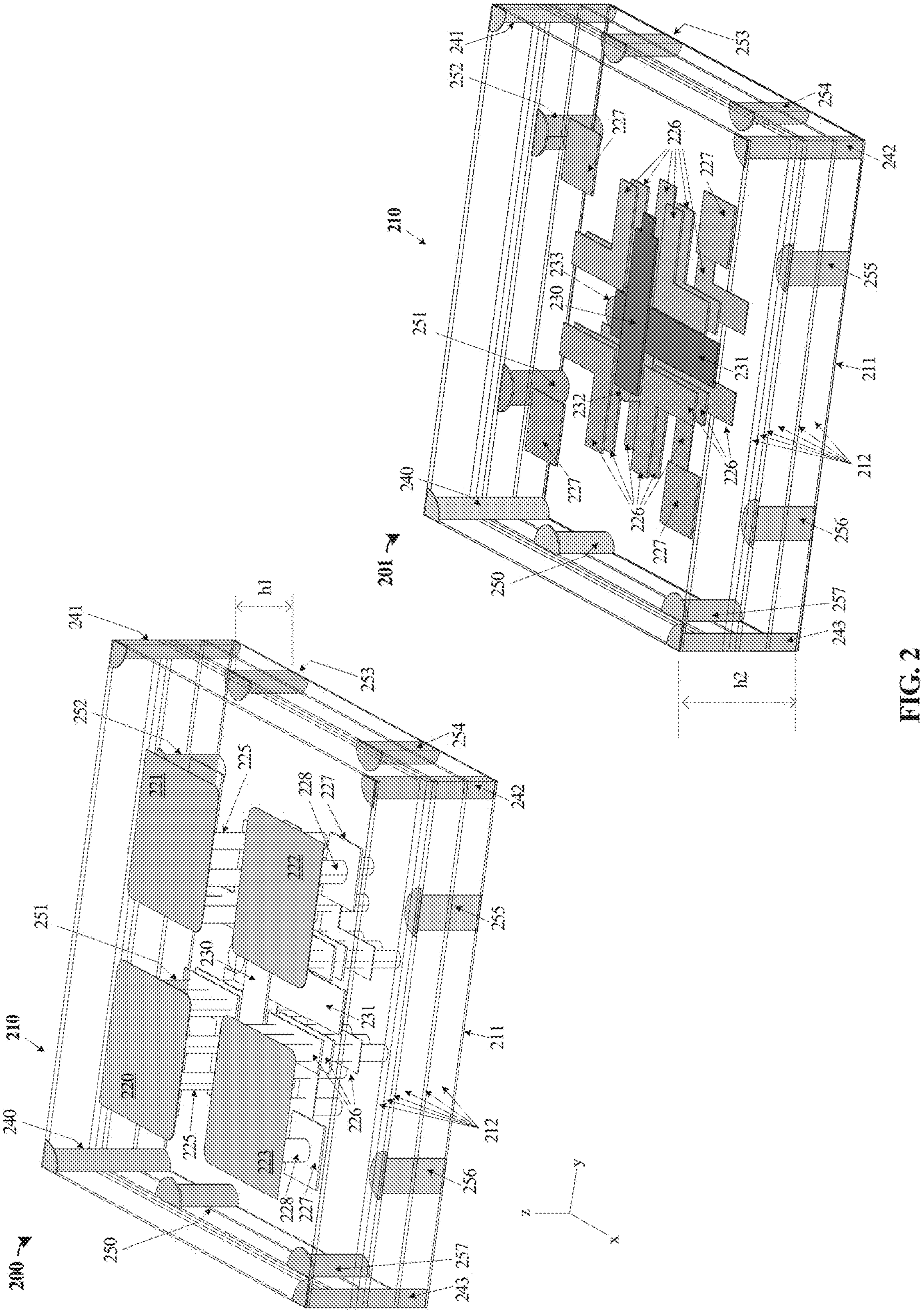
FIG. 2 illustrates internal views of antenna cells in an implementation.

Turning now to a discussion on the individual antenna cells which can be employed in antenna array 110, FIG. 2 is provided. FIG. 2 includes view 200 which shows a partial wireframe view of antenna cell 210, and view 201 which shows a partial wireframe view of antenna cell 210 with selected layers removed to show elements hidden in view 200. Antenna cell 210 is formed from a layered stackup arrangement, such as those employed to form printed circuit boards and similar assemblies, although various additional techniques or processes can be employed. The layered stackup arrangement includes several layers, such as layers 211-212. Layer 211 comprises a ground plane in this example, from which various conductive via structures arise in the vertical or ‘z’ direction. Layers 212 represent the other various routed/conductive and insulating/non-conductive layers, an example of which can be seen in more detail in FIG. 3.

Turning first to view 200, antenna cell 210 includes plate elements (sometimes referred to as patch elements), with each pair forming a dipole for a particular polarization (RHCP, LHCP). Thus, four dipole elements 220-223 are included in a quadrant configuration of the magneto-electric antenna cell. Dipole elements 220-223 are offset by a selected distance from ground plane 211. This offset distance is typically selected to be approximately ¼λ to achieve 180° phase difference between paired dipole elements 220-223, but can vary based on application. Dipole elements 220-223 have a generally square shape in this implementation with outer corner radius features, and are coupled vertically through the stackup to ground plane 211. Vias 225 that couple dipole elements 220-223 to ground plane 211 have several capacitive coupling elements 226 (fins, plates, or ribs) distributed along the vertical length at various layers. Vias 225, when coupled between elements 220-223 and ground plane 221, constitute electrically shorted conductive walls. Also, tuning elements 227 are included and coupled to dipole elements 220-223 by vias 228.

Antenna cell 210 also includes two feed elements which feed or receive RF energy to/from antenna cell 210 and to external RF conductive links. Feed elements 230-231 are considered "co-located" in this example, where vias 232-233 (which couple feed elements 230-231 to external RF links) and feed elements 230-231 are co-located in a central portion of antenna cell 210, instead of having vias 232-233 positioned at an outer edge of the dipole elements. Advantageously, co-located feed elements establish RF energy transmission closer to the center of the boresight of antenna cell 210, and establishes a favorable axial ratio. During transmission operations, feed elements 230-231 excite dipole elements 220-223 by way of magnetic resonance, while feed elements 230-231 provide electric field excitement themselves, establishing the magneto-electric (ME) operation. RF receive operations proceed in a similar, but reversed, manner.

Various resonances or unwanted propagation modes can arise in antenna cell 210. To combat some of these unwanted RF behaviors, several via structures are included in antenna cell 210. A first set of via structures includes corner or vertex vias 240-243. In this example, antenna cell 210 comprises a generally square shape, and thus four vertex vias 240-243 are included. Other-shaped cells might have a different quantity of vertex vias according to the quantity of vertices. A second set of via structures includes perimeter or fence vias 250-257, which are arrayed about an outer perimeter of antenna cell 210. Vertex vias 240-243 can also be considered at the perimeter, and can augment the function of fence vias 250-257. During RF operations, such as transmit and receive, vias 240-243 act to reduce or eliminate a first resonance or set of resonances for antenna cell 210, and vias 250-257 act to reduce or eliminate a second resonance or set of resonances for antenna cell 210. These unwanted resonances or 'modes' are found in-band, and thus elimination or reduction by pushing such resonances "out of band" is desired at boresight and at scan.

Thus, fence vias 250-257 are arrayed about a perimeter of antenna cell 210 and extend vertically from ground plane layer 211 through the layered stackup arrangement to a first height (h1). Vertex vias 240-243 are positioned at perimeter corners/vertices of antenna cell 210 and extend vertically from ground plane layer 211 through the layered stackup arrangement to a second height (h2). The first height, h1, is selected to achieve a reduction of in-band resonance at boresight and at scan for antenna cell 210. The second height, h2, is selected to achieve suppression of propagation modes at a low end of a frequency range selected for antenna cell 210. Typically, the via placement and height can vary based on frequency range, size of antenna cell 210, and other factors. The heights and placement can be parameterized or empirically determined, however, a height differential among vertex vias 240-243 and fence vias 250-257 typically includes vertex vias 240-243 being taller in height than fence vias 250-257. Also, the noted fence and vertex vias can include top side pads which extend wider in diameter than the via portions. When configured as shown in FIG. 2, vertex vias 240-243 can provide for suppression of one or more unwanted in-band resonances at the low end of a frequency range for antenna cell 210. Additional features can be included, such as a perimeter frame shown in FIG. 6, to further reduce unwanted in-band RF resonances.

FIG. 3 is now included for one example implementation of the layered stackup arrangement which can be employed in the various antenna cells and antenna arrays discussed herein. FIG. 3 includes a cross-sectional schematic view of vertical stackup 300. FIG. 3 also includes example stackup 302, which references back to the example stackup found in FIG. 1. Stackup arrangement 300 includes several bulk layer sets, namely sets 320, 330, and 350. Several layers in FIG. 3 are numbered for reference with elements found in FIG. 1.

It should be understood that the heights, thicknesses, materials, arrangement of layers, quantity of layers, and other parameters can vary based on implementation and application, and might be empirically determined or based on parameterization. Also, the features of FIG. 3 are not shown to scale, such as heights and widths. Example estimated thicknesses (in mils or 0.001 of an inch) are provided in FIG. 3, but it should be understood that these thicknesses can vary based on manufacturing tolerances, design choices, and application. Also, the layer descriptions in FIG. 3 are merely exemplary labels, and should not be construed to be definitive, as materials and layer types can vary.

Turning first to layer set 320, superstrate layers 321-323 are shown. Superstrate layers 321-323 having thicknesses as shown in FIG. 3 (in mil or thousandths of an inch), and comprise additively manufactured materials, such as Radix™ or other UV-curable 3D printing resins which have rigid mechanical properties after formation. Layer set 320 can provide impedance matching in some examples, as well as electric charge bleed off or environmental protection and protection from the vacuum of space. Adhesives or other materials can be used to apply superstrate layers 321-323 to each other and to underlying antenna array layer set 330, such as epoxies. However, in some examples the material of superstrate layers 321-323 can be formed as a monolithic structure with each layer self-bonded to each other by the additive manufacturing process, and superstrate layer 321 might be directly printed onto the underlying antenna array layer set 330. The different layers can provide different levels of impedance matching or dielectric constant properties, and can be manufactured to achieve a desired dielectric constant for a selected frequency range. Thus, the rigid superstrate layers might form a WAIM arrangement comprising a monolithic structure additively manufactured from a dielectric material through which radio frequency energy of the antenna cells propagate by at least having a dielectric constant under a threshold value for a frequency range selected for the antenna cells. Other considerations for superstrate layers 321-323 include providing similar dimensional stability and expansion coefficient with respect to adjacent layers or conductive layers (e.g., layer set 330).

Layer set 330 comprises a series of laminated circuit layers to form an antenna structure. Layers 331-344 can be formed using a printed circuit board lamination and manufacturing operations, such as a series of lamination, plating, bonding, and etching steps. Conductive, laminate, and "pre-preg" layers are included. The laminate materials discussed herein can comprise high-frequency compatible circuit board laminate/substrate materials, such as Tachyon® 100G materials, Astra® MT77 materials, or Rogers RO3003™ materials. The pre-preg materials discussed herein refer to low-loss pre-impregnated resin materials having a substrate (e.g., cloth, fiberglass, carbon fiber, or polyaramid, or other materials) with an embedded resin. Example pre-preg materials can include 1078 or 1067 cloth style pre-preg. Examine conductive or conductor materials used to make ground planes, vias, ribs/fins, patch elements, dipole arms, and feed element features include copper, copper alloys, gold, silver, aluminum, or other printed circuit board compatible conductor materials.

Various cross-sectional features are shown formed within layers 331-344. The layered stackup arrangement of layer set 330 has conductive layers (or routable layers) interspersed among non-conductive layers. Layers 332, 333, 335, 337, 338, 340, 342, and 344 comprise non-conductive layers which separate conductive layers and provide stackup heights needed for the various conductive features. Layers 331, 334, 336, 339, 341, and 343 comprise conductive layers which form various conductive elements of the various antenna structures. Antenna structures include dipole structures which include dipole elements 370-371 coupled to ground plane 331 through associated vias (e.g., via 372) and to capacitive tuning plates 361 through associated vias 362. Antenna structures also include two feed elements, with first feed element 380 coupled by via 382 to RF link 311 and second feed element 381 coupled by via 383 to RF link 312. RF links 311 and 312 are shown schematically in FIG. 3 as routed through layer set 350 to reach external connections. In practice, these RF links can include various routing through layers 352 and connectors at layer 351. Antenna structures also include via structures 363 which are coupled by vias 364 to ground plane 331. These via structures can be those which surround feed elements, those which form a perimeter fence arrangement, or those at vertices of an antenna cell, with associated heights for each via structure formed according to the examples shown herein. It can be seen from the various thicknesses in FIG. 3, that laminate layers 332, 335, 338, and 342 comprise generally thicker layers than the pre-preg layers and conductive layers. These thicknesses can establish the stackup heights and height differentials among the various elements. One example laminate associated with dipole arms 334 is Tachyon 100G laminate, with electrical properties of $\varepsilon_r$=3.02 and tan $\delta$=0.0021 at 10 GHz.

Optional milled voids 390 can be included through several of the layers beneath layer 343 and dipole elements 370-371. Voids 390 comprise non-plated through-hole features that have a controlled depth stop which ends at layer 342, and can start at layer 331 or penetrate through layer 331. These void features can be formed at any suitable stage in the manufacturing and assembly, such as when accessible at the sub-assembly stage for layer set 330. It should be understood that subtractive machining, milling, boring, drilling, etching, or other techniques can be employed, as well as additive manufacturing or 3D printing.

Layer set 350 includes conductive baseplate 351 and interconnect substrate 352. Baseplate 351 comprises an aluminum material in this example. Various other conductive materials or compositions can be employed, such as copper, aluminum alloys, steel, magnesium, nickel, silver, gold, or metal-coated substrates using any suitable conductive material or composition. This base plate is employed for staking, soldering, or attachment of connectors and for structural rigidity, such as mini-SMP connectors or those described above. Example thicknesses include approximately 60 mils.

Interconnect substrate 352 can be bonded to layer set 330 by adhesive layer 353. Layer 353 includes a layer of adhesive to couple the interconnect substrate 352 to a series of printed circuit layers. This adhesive can be selected from any suitable type for the materials and environmental conditions, such as Toray MicroPly EX-1516. Interconnect substrate 352 includes various structures which route/couple RF connections provided on baseplate 351 to corresponding RF antenna cell structures and feed elements of antenna array layer set 330. Example materials and configurations include printed circuit boards formed using materials mentioned above, or other stacked/laminated materials. Other examples include micro-machined, layered, or printed planar RF connections, such as that provided by processes including PolyStrata®, a form of surface micromachining, which can achieve monolithic integration around a nearly air-loaded rectangular coaxial line with interconnection of vertical layers on a wafer scale.

A sequence of manufacturing for vertical stackup 300 can include forming various sub-assemblies which are then joined to form a completed assembly. Typically, a sub-array of antenna cells is formed in a single assembly, and many such sets can be later joined to form a larger array according to the requirements of the application. As for individual layers within the vertical stackup, one example sequence includes a first sub-assembly formed from a lamination sequence that establishes a stackup of layers 331-344, which can be similar to a printed circuit board manufacturing process. This first sub-assembly might comprise a PCB in some examples. Underside milled voids or hog outs can be established below the dipole arms through a portion of the PCB or layered stackup. Then, after this first sub-assembly is formed, external layers can be applied, such as any among substructure layers 351-353 and superstructure layers 321-323. For layer 351 (e.g., baseplate), connectors can be staked to the material forming the baseplate, and then the connectors can be soldered to layer 352 (e.g., reflow/soldering). Superstructure layers 321-323 can then be bonded into a final assembly with a first assembly comprising layer sets 350 and 330 to prevent heat degradation of the superstructure or other materials from solder reflow operations. The final assembly can be "baked out" prior to completion to drive out any retained moisture. Thus, in summary of an example manufacturing process, a layered stackup arrangement can be formed having an array of antenna cells. Each of the antenna cells can be formed to include dipole arms coupled by vias through the layered stackup arrangement, with co-located feeds and other various conductive structures.

Figure 4:
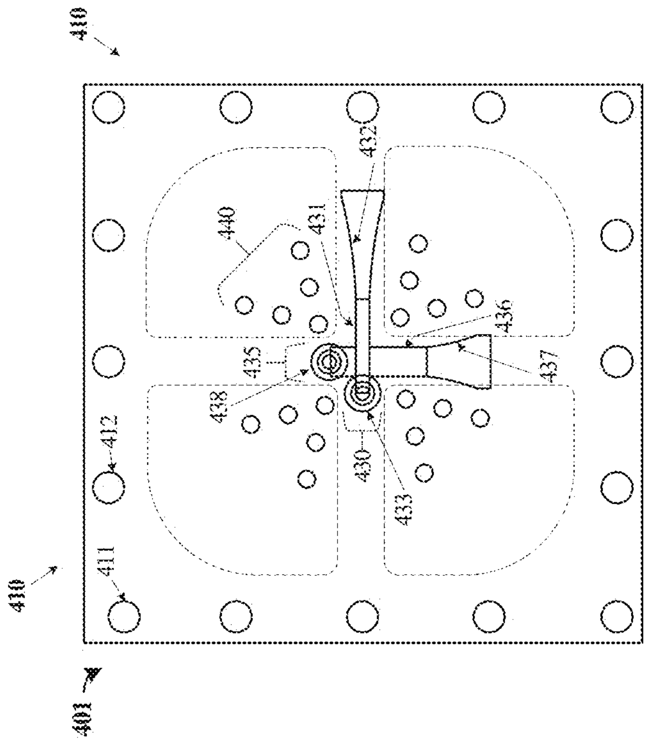
FIG. 4 illustrates views of an antenna cell with flared co-located feed elements in an implementation.
Figure 4:
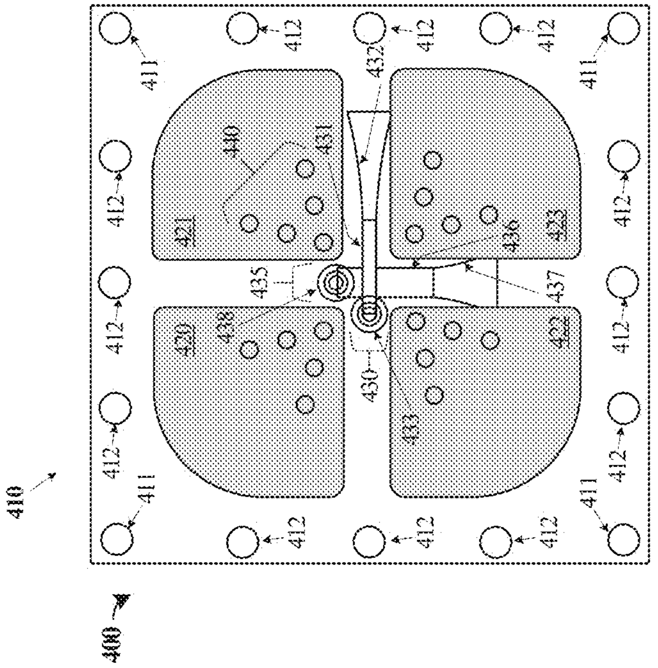
Figure 5:
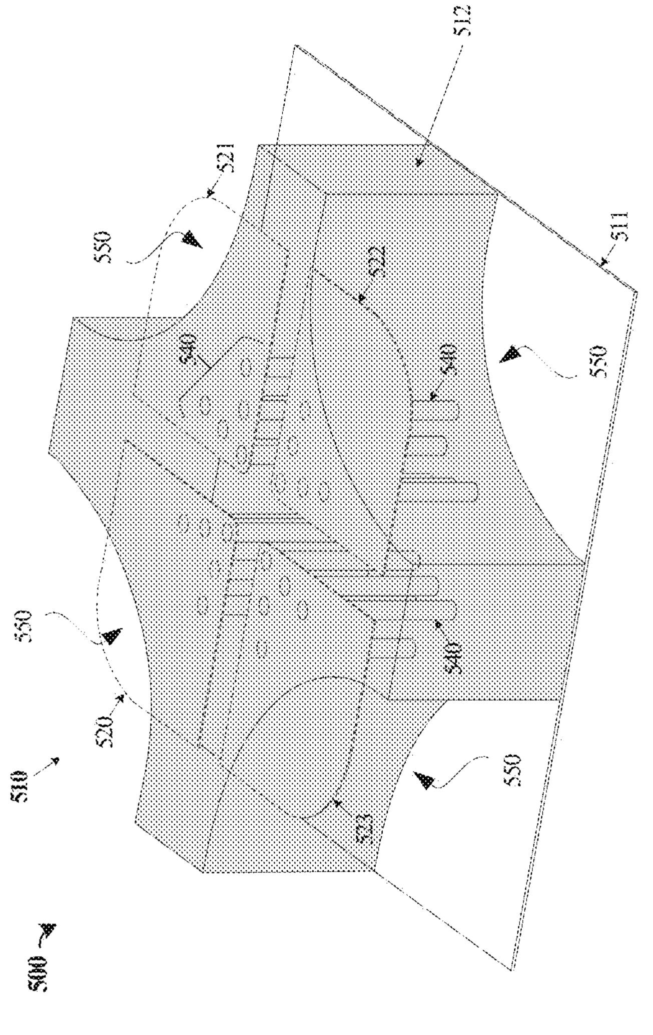
FIG. 5 illustrates a view of an antenna cell with underside-milled voids in an implementation.
Figure 6:
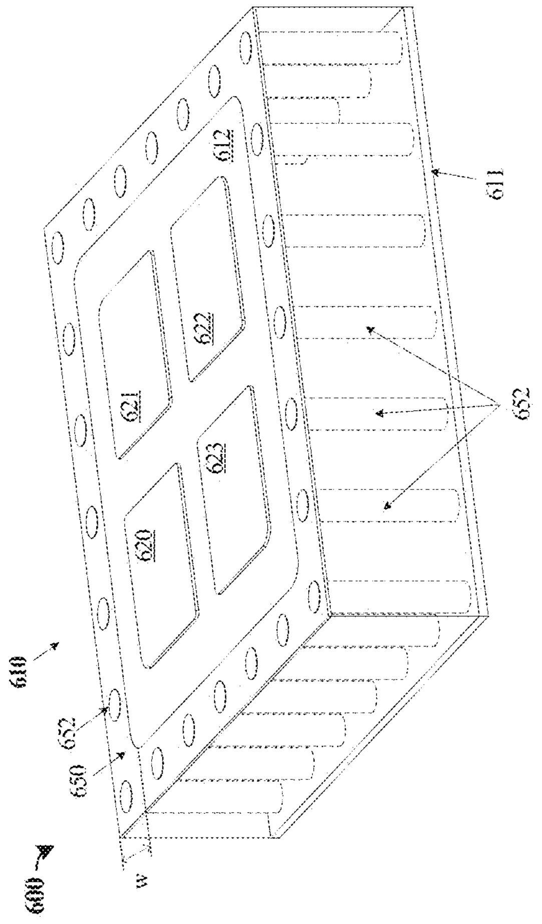
FIG. 6 illustrates a view of an antenna cell with a perimeter fence in an implementation.
Figure 7:
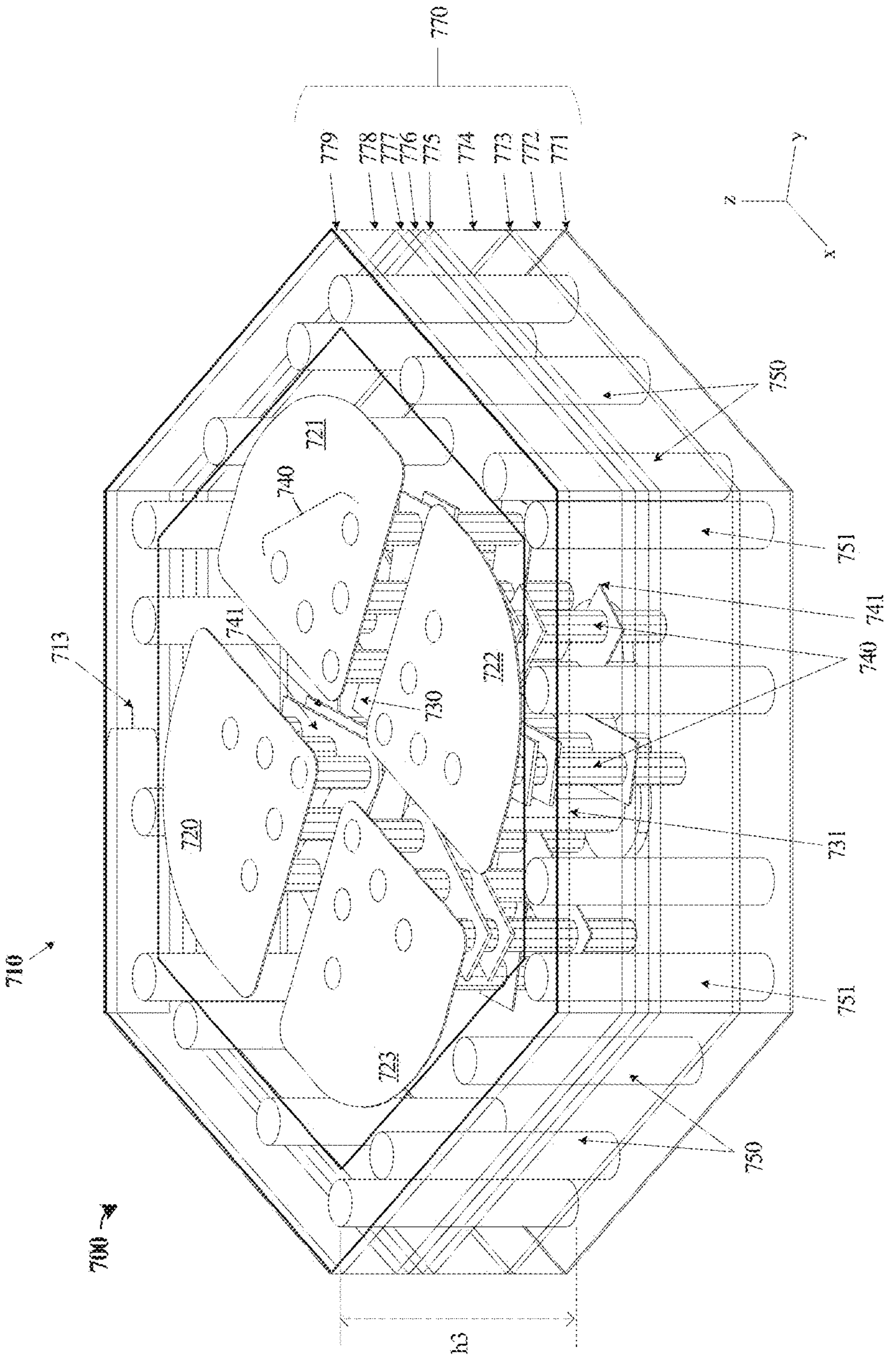
FIG. 7 illustrates a view of an antenna cell having a hexagonal arrangement in an implementation.

Now the discussion turns to various enhancements which can be applied to the various antenna cells and antenna arrays found in FIGS. 1-3. One or more of these enhancements can be applied concurrently to an antenna cell or antenna array. FIG. 4 illustrates flared feed elements with via structures surrounding the feed elements. FIG. 5 illustrates voids established below dipole elements. FIG. 6 illustrates perimeter fencing for an antenna cell. FIG. 7 illustrates a differently shaped antenna cell, namely a hexagonal antenna cell arrangement.

Turning now to FIG. 4, an example implementation of an antenna cell is shown such as antenna cell 131 of FIG. 1 or antenna cell 210 of FIG. 2, but with enhanced feed element structures. View 400 shows a top-down wireframe view of portions of antenna cell 410, and view 401 shows a top-down wireframe view of antenna cell 410 with dipole elements hidden. It should be understood that other elements of an antenna cell are hidden from view or omitted for clarity in FIG. 4. Elements of antenna cell 410 can be employed in any of the antenna array configurations discussed herein.

In view 400, antenna cell 410 includes dipole elements 420-423 which have underlying feed elements 430 and 435 positioned within dipole gaps. Vertex vias 411 and fence vias 412 are included about a perimeter of antenna cell 410, and have corresponding heights discussed herein for similar via structures. Also, feed via structures 440 are included which establish barriers, channels, or bounded fence regions into which feed elements 430 and 435 are positioned. Feed via structures 440 also couple dipole elements 420-423 to an underlying ground plane (not shown in FIG. 4), and thus are mirrored for each dipole element or placed in each "quadrant" of antenna cell 410. Feed via structures 440, when coupled between dipole elements 420-423 and a ground plane, constitute electrically shorted conductive walls.

Feed elements 430 and 435 provide dual CP operation, and are arranged in a perpendicular or orthogonal arrangement. Feed elements 430 and 435, in combination with dipole elements 420-423, can provide concurrent RHCP operation and LHCP operation for antenna cell 410. To achieve an enhanced operation, feed elements 430 and 435 have a co-located arrangement and comprise a flared or tapered configurations. The flared antenna feeds have feed vias positioned proximate to a center of antenna cell 410 to establish a selected axial ratio among feed elements 430 and 435. These flared shapes have an initial portion (431 and 436) and a terminal portion (432 and 437), although other configurations are possible. The flare at terminal portions provides a smooth or linear ramp or curve outward from a center line of the respective feed, which terminates at a generally flat edge proximate to the terminal portion of the feed. Feed vias 433 and 438 couple RF links to a corresponding feed element, and establish a vertical height above a ground plane for each via. The flared configuration with feed fence vias provides increased bandwidth for antenna cell 410 at boresight and at scan. Also, the co-located configuration provides dual CP (RHCP/LHCP) with low axial ratio (AR) at less than 3 dB.

Turning now to FIG. 5, an example implementation of an antenna cell is shown such as antenna cell 131 of FIG. 1 or antenna cell 210 of FIG. 2, but with enhanced dielectric voids established in the vertical stackup. View 500 shows an isometric wireframe view of portions of antenna cell 510. It should be understood that other elements of an antenna cell are hidden from view or omitted for clarity in FIG. 5. For example, perimeter elements are omitted from antenna cell 510 in FIG. 5 to better illustrate voids 550. Elements of antenna cell 510 can be employed in any of the antenna array configurations discussed herein.

Vertical stackup 512 is shown as a 'bulk' section of material, but comprises many individual layers, such as shown in FIG. 3 for layer set 330. Moreover, dipole elements 520-523 are hidden from view for clarity, but would typically be a topmost layer on bulk 512. Also, vias 540 can be seen which couple dipole elements 520-523 to ground plane 511. Vias 540, when coupled between dipole elements 520-523 and ground plane 511, constitute electrically shorted conductive walls.

Material within the layered stackup of bulk 512 can be bored or hogged out below dipole elements 520-523 in the printed circuit board layers/materials to form vertical voids 550. Voids 550 are formed through the layered stackup arrangement beneath dipole elements 520-523 and extending downward to at least a substrate layer. These milled or drilled voids 550 can increase bandwidth of each antenna cell at boresight and lower the overall effective dielectric constant (K or Dk) for the antenna cells to provide for impedance matching and overall efficiency increases. Voids 550 can also increase a bandwidth of antenna cell 510 at boresight approximately 2:1.

Turning now to FIG. 6, an example implementation of an antenna cell is shown such as antenna cell 131 of FIG. 1 or antenna cell 210 of FIG. 2, but with enhanced perimeter fence material provided in antenna cell 610. View 600 shows an isometric wireframe view of portions of antenna cell 610. It should be understood that other elements of an antenna cell are hidden from view or omitted for clarity in FIG. 6. For example, internal elements are omitted from antenna cell 610 in FIG. 6 to better illustrate perimeter elements. Elements of antenna cell 610 can be employed in any of the antenna array configurations discussed herein.

Dipole elements 620-623 are shown at a top layer in antenna cell 610 formed onto laminate or pre-preg layer 612. Also formed onto the same layer 612 is a "picture frame" or perimeter frame 650 establishing a conductive border surrounding antenna cell 610. Perimeter frame 650 comprises a conductive or metallized features formed about the perimeter of antenna cell 610 which is coupled over vias 652 to ground plane 611. Perimeter frame 650 has a frame width (w) as shown, which can be parameterized based on application and desired performance. Perimeter frame 650 thus comprises a conductive planar frame formed in the layered stackup arrangement about the perimeter of antenna cell 610 at the dipole layer and coupled by vias extending vertically from ground plane layer 611 through the layered stackup arrangement.

During operation, perimeter frame 650 can suppress various unwanted modes at boresight and at scan, but may limit port performance over scan (e.g., efficiency). Vias 652 can comprise additional vias added to supplement vertex vias and fence vias (as discussed herein), or can replace vertex vias and fence vias. In replacement cases, similar heights might be employed for all perimeter vias.

FIG. 7 includes view 700 which shows a partial wireframe view of antenna cell 710. FIG. 7 illustrates a view of an antenna cell having a hexagonal arrangement in an implementation. Antenna cell 710 is shown in view 700, which illustrates a ME dipole antenna that supports a triangular lattice and supports frequency ranges up to at least the Ka band and an axial ratio less than 3 db from at least 20 GHz to 22 GHz. As seen in view 700, antenna cell 710 has a generally hexagonal shape and dipole elements 720-723 have generally triangular shapes, with outer edges of the dipole elements having a circular radius. This is in contrast to other example antenna cells discussed herein with generally square antenna cells having generally square dipole elements.

Antenna cell 710 is formed from a layered stackup arrangement, such as those employed to form printed circuit boards and similar assemblies, although various additional techniques or processes can be employed. The layered stackup arrangement includes several layers, such as layers 771-779. Layer 771 comprises a ground plane in this example, from which various conductive via structures arise in the vertical or 'z' direction. Layers 772-779 represent the other various routed/conductive and insulating/non-conductive layers, an example of which can be seen in more detail in FIG. 3.

Antenna cell 710 includes dipole elements 720-723, with each pair forming a dipole for a particular polarization (RHCP, LHCP). Thus, four dipole elements 720-723 are included, which are offset by a selected distance from ground plane 771, which corresponds to height h3 in this example. This offset is typically selected to be approximately ¼λ to achieve 180° phase difference between paired dipole elements 720-723, but can vary based on application. Dipole elements 720-723 are coupled vertically through the stackup to ground plane 771 with feed via structures 740, and have several capacitive coupling elements 741 (fins, plates, or ribs) distributed along the vertical length at various layers.

Antenna cell 710 also includes two feed elements which feed or receive RF energy to/from antenna cell 710 and to external RF conductive links. Feed elements are mostly hidden from view in FIG. 7, with a portion of feed element 730 and feed via 731 visible. The feed elements of antenna cell 710 can be co-located, where feed vias (which couple feed elements to external RF links) for each feed element is co-located in a central portion of antenna cell 710. During transmission operations, feed elements excite dipole elements 720-723 by way of magnetic resonance, while feed elements provide electric field excitement themselves, establishing the magneto-electric (ME) operation. RF receive operations proceed in a similar, but reversed, manner.

Dipole elements 720-723 have underlying feed elements (e.g., 730) positioned within dipole gaps. Fence vias 750 and vertex vias 751 are included about a perimeter of antenna cell 710, and have corresponding heights, h3. Also, feed via structures 740 are included which establish barriers, channels, or bounded fence regions into which feed elements are positioned. Feed elements can be tapered or flared. Feed via structures 740 also couple dipole elements 720-723 to an underlying ground plane 771, and thus are mirrored in for each dipole element.

In this example, antenna cell 710 comprises a generally hexagonal shape, and thus six vertex vias 751 are included. A second set of via structures includes perimeter or fence vias 750, which are arrayed about an outer perimeter of antenna cell 710. In this example, both fence vias 750 and vertex vias 751 are of the same height and are arrayed about the perimeter, forming a fence about the entire cell. Moreover, these vias can extend vertically through the entire stackup to a picture frame or conductive border structure 713 formed at the same layer as dipole elements 720-723. During RF operations, such as transmit and receive, vias 750-751 act to reduce or eliminate resonances for antenna cell 710. These unwanted resonances or 'modes' are found in-band, and thus elimination or reduction by pushing such resonances "out of band" is desired at boresight and at scan.

Finally, layers 771-779 are labeled in view 700. Layer 771 comprises a ground plane layer formed by a conductive plane. Laminate layers 772, 774, and 778 establish stackup heights needed to separate various elements, like feed elements, capacitive plates, and dipole elements from ground plane layer 771. Conductive layers 773, 775, 777, and 779 are employed to form the various conductive elements of antenna cell 710, such as feed elements, capacitive plates, and dipole elements. Finally, pre-preg layers form further isolation layers in the stackup and form substrates onto which each conductive layer is formed. Example materials are discussed herein for FIG. 3.

Figure 8:
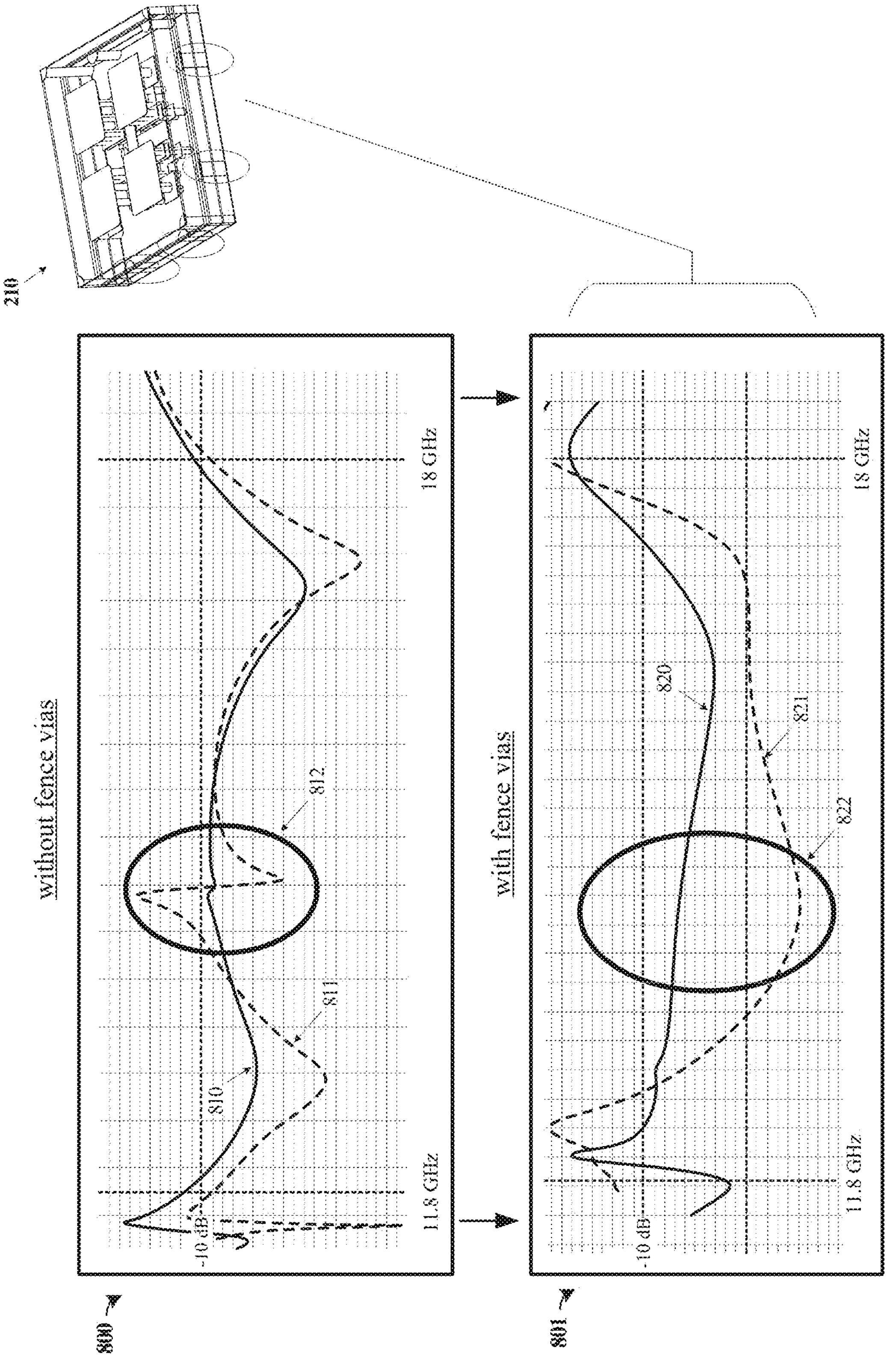
FIG. 8 illustrates RF performance of an antenna cell in an implementation.

FIG. 8 illustrates performance characteristics for an antenna cell described herein, such as for antenna cell 210 which incorporates fence vias. Example antenna cell 210 is pictured in FIG. 8 to illustrate fence vias (e.g., fence vias 250-257), about a perimeter of antenna cell 210. FIG. 8 includes graph 800 illustrating example RF performance for an antenna cell without fence vias, and graph 801 illustrating RF performance for an antenna cell with fence vias. Graph 800 includes curves 810 and 811 and graph 801 includes curves 820 and 821, which compare RF performance from 11.8 GHz to 18 GHz (horizontal axis). The vertical axis corresponds to decibels (dB). Curves 810 and 820 correspond to S-parameter S11 (theta=15), and curves 811 and 821 correspond to S-parameter S21 (theta=45).

S-parameters are measurements or simulations of performance of an RF system or waveguide structure. S11 corresponds to the input reflection coefficient with an output of the waveguide structure terminated by a matched load, and S21 corresponds to insertion loss for forward transmission (e.g., RF propagation from a first port to a second port). Typically, these are simulated or measured over a frequency sweep, such as 11.8 GHz to 18 GHz in graphs 800 and 801.

As can be seen in graph 800, in-band resonance 812 is experienced by an antenna cell without fence vias. Graph 801 shows reduction of this in-band resonance, absent from area 822. Advantageously, the in-band resonance of graph 800 can be pushed out of band or reduced entirely by use of fence vias in an antenna cell, as described herein. This enhanced performance is achieved at both boresight and at scan.

Figure 9:
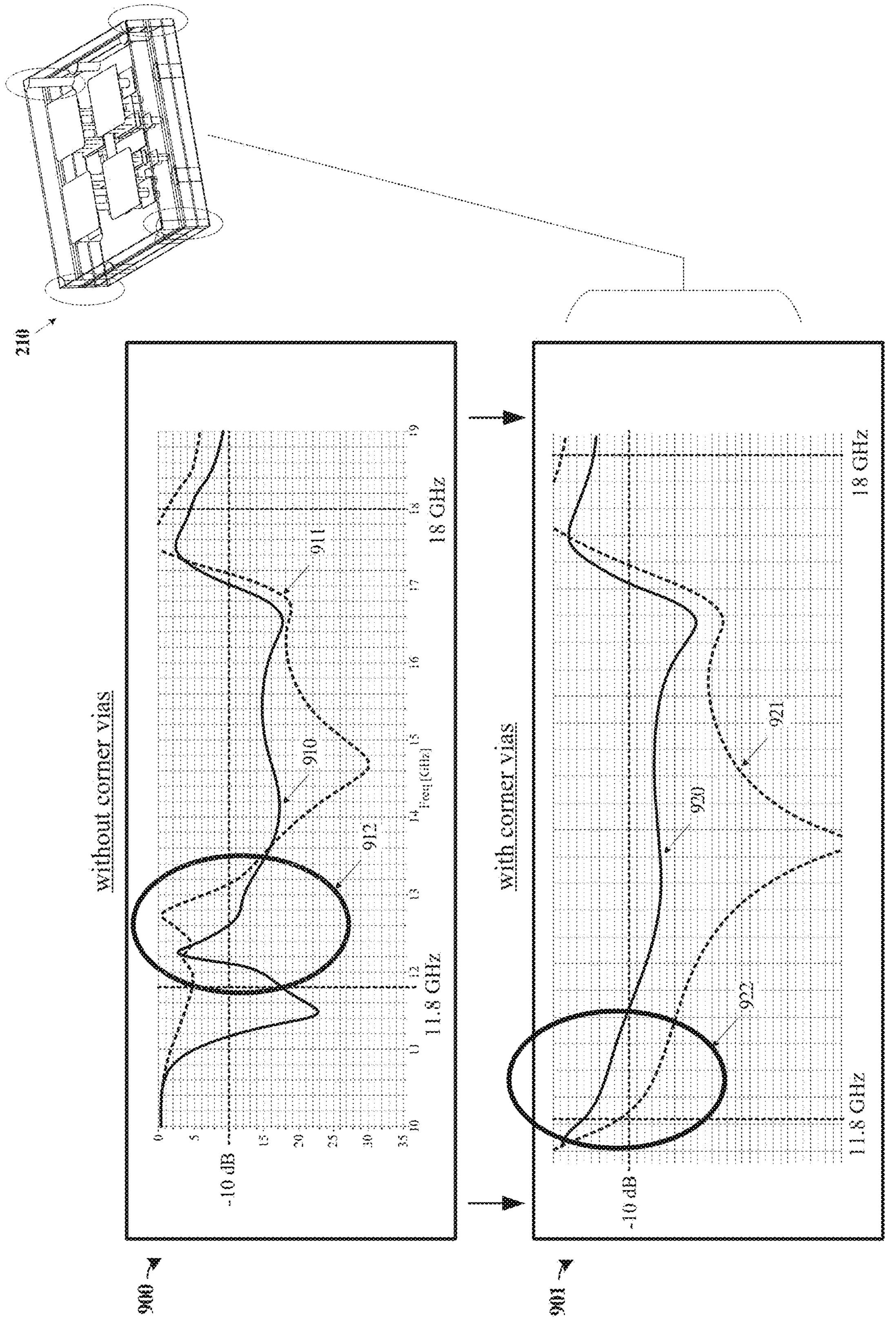
FIG. 9 illustrates RF performance of an antenna cell in an implementation.

FIG. 9 illustrates performance characteristics for an antenna cell described herein, such as for antenna cell 210 which incorporates corner or vertex vias. Example antenna cell 210 is pictured in FIG. 9 to illustrate corner vias (e.g., vertex vias 240-243), about a perimeter of antenna cell 210. FIG. 9 includes graph 900 illustrating example RF performance for an antenna cell without corner vias, and graph 901 illustrating RF performance for an antenna cell with corner vias. Graph 900 includes curves 910 and 911 and graph 901 includes curves 920 and 921, which compare RF performance from 11.8 GHz to 18 GHz (horizontal axis). The vertical axis corresponds to decibels (dB). Curves 910 and 920 correspond to S-parameter S11 (theta=60), and curves 911 and 921 correspond to S-parameter S21 (theta=60).

As can be seen in graph 900, in-band resonance 912 is experienced by an antenna cell without corner vias. Graph 901 shows reduction of this in-band resonance, absent from area 922. Advantageously, the in-band resonance of graph 900 can be pushed out of band or reduced entirely by use of corner vias in an antenna cell, as described herein. This enhanced performance is achieved at both boresight and at scan.

Figure 10:
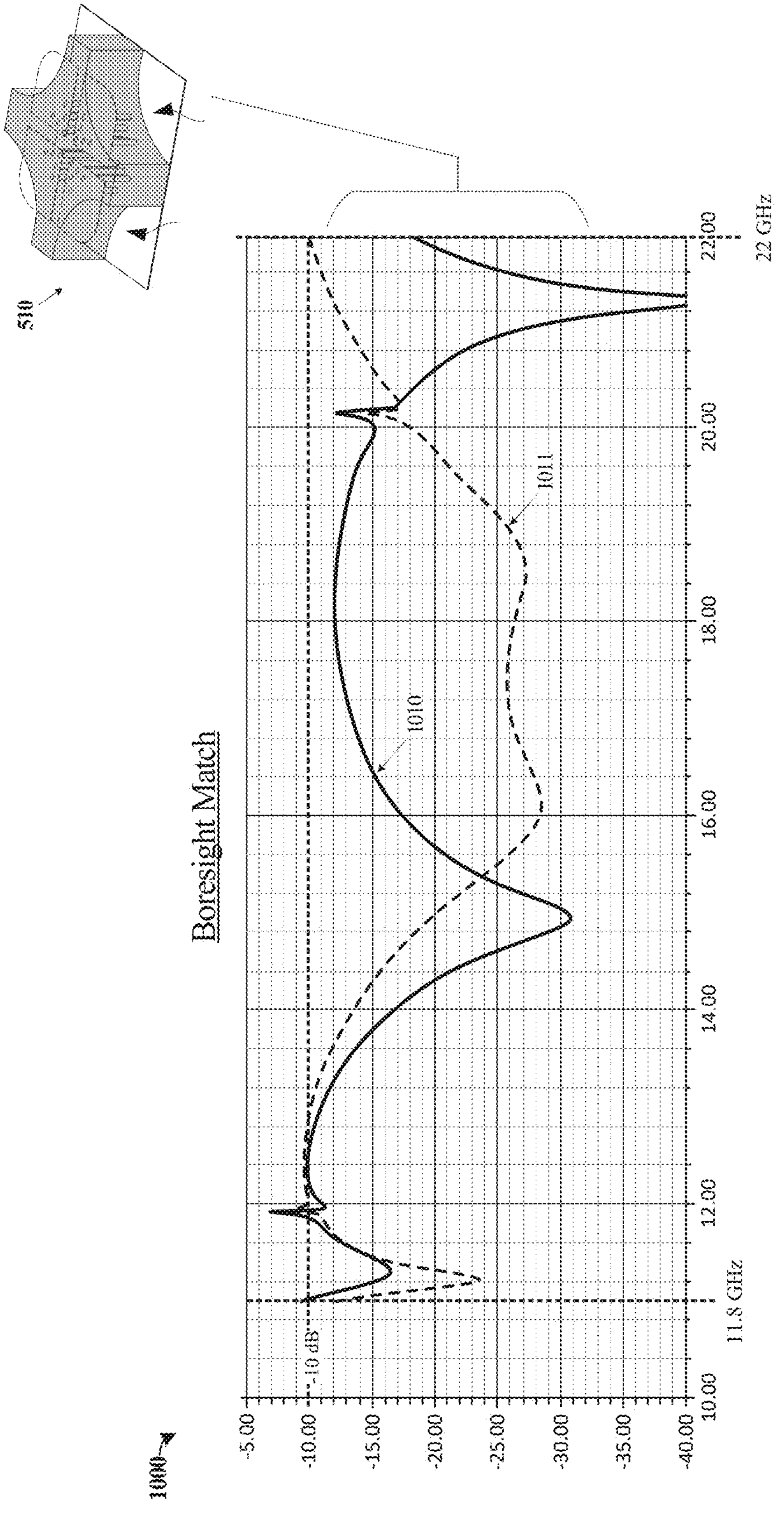
FIG. 10 illustrates RF performance of an antenna cell in an implementation.

FIG. 10 illustrates performance characteristics for an antenna cell described herein, such as for antenna cell 510 which incorporates voids underneath dipole elements. Example antenna cell 510 is pictured in FIG. 10 to illustrate underside voids (e.g., voids 550-553). FIG. 10 includes graph 1000 illustrating RF performance for an antenna cell with underside voids. Graph 1000 includes curves 1010 and 1011 which show RF performance for boresight match from 11.8 GHz to 22 GHz (horizontal axis). The vertical axis corresponds to decibels (dB). Curve 1010 corresponds to S-parameter S11, and curve 1011 corresponds to S-parameter S21. Advantageously, the boresight match with the use of voids can achieve performance of under-10 dB from 11.8 GHz to 22 GHz, with one noted in-band resonance. This is achieved by drilled holes in an antenna cell which lowers the effective Dk of the antenna cell and increases bandwidth at Boresight ~2:1.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An assembly, comprising:

a plurality of antenna cells formed in a shared printed circuit board stackup;

a rigid superstrate layer mounted onto the printed circuit board stackup; and a substrate layer mounting the printed circuit board stackup to a baseplate;

wherein each of the antenna cells comprises:

dipole elements at quadrants of the antenna cell and coupled through vias in the layered stackup arrangement from a dipole layer to a ground plane layer;

flared antenna feeds arranged in an orthogonal pair positioned within central gaps between the dipole elements and below the dipole layer;

barrier vias positioned in sets below the dipole elements in each of the quadrants and arrayed about the flared antenna feeds; and fence vias arrayed about a perimeter of the associated antenna cell and extending vertically from the ground plane layer through the layered stackup arrangement to a first height.

2. The assembly of claim 1, wherein each of the antenna cells comprise:

corner vias positioned at perimeter vertices of the associated antenna cell and extending vertically from the ground plane layer through the layered stackup arrangement to a second height.

3. The assembly of claim 2, wherein the second height is greater than the first height;

wherein the first height is selected to achieve a reduction of in-band resonance at boresight and at scan for the associated antenna cells; and wherein the second height is selected to achieve suppression of propagation modes at a low end of a frequency range selected for the associated antenna cells.

4. The assembly of claim 1, wherein each of the antenna cells comprise:

a conductive planar frame formed in the layered stackup arrangement about the perimeter of the associated antenna cell at the dipole layer and coupled by vias extending vertically from the ground plane layer through the layered stackup arrangement.

5. The assembly of claim 1, wherein each of the antenna cells comprise:

voids formed through the layered stackup arrangement beneath the dipole elements and extending to at least the substrate layer.

6. The assembly of claim 1, wherein the rigid superstrate layer forms a wide angle impedance matching (WAIM) arrangement comprising a monolithic structure additively manufactured from a dielectric material through which radio frequency energy of the antenna cells propagate by at least having a dielectric constant under a threshold value for a frequency range selected for the antenna cells.

7. The assembly of claim 1, wherein each of the antenna cells comprise:

the flared antenna feeds having feed vias coupled to radio frequency links and positioned proximate to a center of the associated antenna cell to establish a selected axial ratio among the flared antenna feeds.

8. The assembly of claim 7, wherein the substrate layer routes the feed vias to connectors mounted to the baseplate supplying the radio frequency links.

9. The assembly of claim 1, wherein the antenna cells comprise a generally square configuration, and the dipole elements comprise a generally square shape.

10. The assembly of claim 1, wherein the antenna cells comprise a generally hexagonal configuration, and the dipole elements comprise a generally triangular shape.

11. An apparatus, comprising:

a substrate layer mounting a magneto-electric antenna cell to a baseplate;

a rigid superstrate layer mounted onto the magneto-electric antenna cell and having a dielectric constant under a threshold value for a frequency range selected for the magneto-electric antenna cell; and the magneto-electric antenna cell formed by a layered stackup arrangement and comprising:

conductive plates at quadrants of the magneto-electric antenna cell and coupled through vias in the layered stackup arrangement from a plate layer to a ground plane layer;

flared antenna feeds arranged in an orthogonal pair positioned within central gaps between the conductive plates and below the plate layer;

barrier vias positioned in sets below the conductive plates in each of the quadrants and arrayed about the flared antenna feeds; and fence vias arrayed about a perimeter of the magneto-electric antenna cell and extending vertically from the ground plane layer through the layered stackup arrangement to a first height.

12. The apparatus of claim 11, comprising:

corner vias positioned at perimeter vertices of the magneto-electric antenna cell and extending vertically from the ground plane layer through the layered stackup arrangement to a second height.

13. The apparatus of claim 12, wherein the second height is greater than the first height;

wherein the first height is selected to achieve a reduction of in-band resonance at boresight and at scan; and wherein the second height is selected to achieve suppression of propagation modes at a low end of the frequency range.

14. The apparatus of claim 11, comprising:

a conductive planar frame formed in the layered stackup arrangement about the perimeter of the magneto-electric antenna cell at the plate layer and coupled by vias extending vertically from the ground plane layer through the layered stackup arrangement.

15. The apparatus of claim 11, comprising:

voids formed through the layered stackup arrangement beneath the conductive plates and extending to at least the substrate layer.

16. The apparatus of claim 11, wherein the rigid superstrate layer forms a wide angle impedance matching (WAIM) arrangement comprising a monolithic structure additively manufactured from a dielectric material through which radio frequency energy of the magneto-electric antenna cell propagates.

17. The apparatus of claim 11, comprising:

the flared antenna feeds having feed vias coupled to radio frequency links and positioned proximate to a center of the magneto-electric antenna cell to establish a selected axial ratio among the flared antenna feeds.

18. The apparatus of claim 17, wherein the substrate layer routes the feed vias to connectors mounted to the baseplate supplying the radio frequency links.

19. The apparatus of claim 11, wherein the magneto-electric antenna cell comprises the conductive plates aligned congruently with sides of the magneto-electric antenna cell forming a generally square configuration.

20. The apparatus of claim 11, wherein the magneto-electric antenna cell comprises the conductive plates skewed from sides of the magneto-electric antenna cell forming a generally hexagonal configuration.

* * * * *